United States Patent
Tao et al.

(10) Patent No.: US 12,204,207 B2
(45) Date of Patent: Jan. 21, 2025

(54) BACKLIGHT MODULE, DISPLAY PANEL AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Ran Tao, Beijing (CN); Xiaochun Shi, Beijing (CN); Fei Ling, Beijing (CN); Haifeng Xu, Beijing (CN); Qingyi Zhuang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/920,529

(22) PCT Filed: Oct. 26, 2021

(86) PCT No.: PCT/CN2021/126311
§ 371 (c)(1),
(2) Date: Oct. 21, 2022

(87) PCT Pub. No.: WO2022/247131
PCT Pub. Date: Dec. 1, 2022

(65) Prior Publication Data
US 2024/0210759 A1    Jun. 27, 2024

(30) Foreign Application Priority Data
May 24, 2021    (CN) .......................... 202110566746.9

(51) Int. Cl.
*G02F 1/13357*    (2006.01)
*F21V 8/00*    (2006.01)

(52) U.S. Cl.
CPC ..... *G02F 1/133615* (2013.01); *G02B 6/0051* (2013.01); *G02B 6/0053* (2013.01); *G02B 6/0088* (2013.01)

(58) Field of Classification Search
CPC ............ G02F 1/133615; G02B 6/0051; G02B 6/0053; G02B 6/0088
See application file for complete search history.

(56) References Cited

U.S. PATENT DOCUMENTS

| | | |
|---|---|---|
| 2012/0218696 A1 | 8/2012 | Kim et al. |
| 2018/0059317 A1* | 3/2018 | Kim .................... G02B 6/0081 |

FOREIGN PATENT DOCUMENTS

| | | |
|---|---|---|
| CN | 1831615 A | 9/2006 |
| CN | 202008065 U | 10/2011 |

(Continued)

OTHER PUBLICATIONS

Zhou, CN 104375323, Feb. 2015 (Year: 2015).*

(Continued)

*Primary Examiner* — Mary Ellen Bowman
(74) *Attorney, Agent, or Firm* — Nath, Goldberg & Meyer; Joshua B. Goldberg

(57) ABSTRACT

Provided is a backlight module, including: a backplate, a light guide plate and an optical film layer. The backplate includes a bottom plate and side plates. The bottom plate and the side plates forms an accommodating space. The light guide plate and the optical film layer are sequentially stacked on the bottom plate in the accommodating space. The backlight module includes a display area and a bezel area. The light guide plate includes a main body portion and a first limiting portion arranged on a side, facing the optical film layer, of the main body portion, at least part of the first limiting portion is located in the bezel area, the first limiting portion limits a position of the optical film layer; an orthographic projection of the first limiting portion on the bottom (Continued)

plate is at least partially located outside a side edge of the bottom plate.

13 Claims, 8 Drawing Sheets

(56) References Cited

FOREIGN PATENT DOCUMENTS

| CN | 103090278 A | 5/2013 |
|---|---|---|
| CN | 204069051 U | 12/2014 |
| CN | 104375323 A | 2/2015 |
| CN | 105042515 A | 11/2015 |
| CN | 205067925 U | 3/2016 |
| CN | 105765448 A | 7/2016 |
| CN | 207164399 U | 3/2018 |
| CN | 207366886 U | 5/2018 |
| CN | 207908836 U | 9/2018 |
| CN | 208834054 U | 5/2019 |
| CN | 210006373 U | 1/2020 |
| CN | 210244012 U | 4/2020 |
| CN | 211554563 U | 9/2020 |
| CN | 211627969 U | 10/2020 |
| CN | 111880336 A | 11/2020 |
| CN | 112114396 A | 12/2020 |
| CN | 215449821 U | 1/2022 |
| JP | 2013045559 A | 3/2013 |
| JP | 2014224939 A | 12/2014 |

OTHER PUBLICATIONS

Chen et al., CN 205067925, Mar. 2016 (Year: 2016).*
The First Office Action dated Nov. 28, 2024 corresponding to Chinese application No. 202110566746.9.

* cited by examiner

BACKLIGHT MODULE, DISPLAY PANEL AND DISPLAY DEVICE

This is a National Phase Application filed under 35 U.S.C. 371 as a national stage of PCT/CN2021/126311, filed Oct. 26, 2021, an application claiming the benefit of Chinese Patent Application No. 202110566746.9, filed May 24, 2021, the content of each of which is hereby incorporated by reference in its entirety.

TECHNICAL FIELD

The present disclosure relates to the field of display technology, and particularly relates to a backlight module, a display panel and a display device.

BACKGROUND

With the increasing development of on-vehicle display technology, more and more customers expect a bezel of a display module to be narrower and narrower, and thus, a bezel of a backlight module of the display module is also desired to be narrower and narrower, and some customers desires the bezel of the backlight module to be less than 4 mm. Unlike consumer display modules, an on-vehicle display module is desired to meet higher requirements of experiments such as a reliability test and a mechanical impact test. Therefore, the expectations for fixing film layers in the backlight module are also higher, and the design of fixing the film layers in the backlight module with an ultra-narrow bezel is more difficult.

SUMMARY

Embodiments of the present disclosure provide a backlight module, a display panel and a display device.

In a first aspect, an embodiment of the present disclosure provides a backlight module, including: a backplate, a light guide plate and an optical film layer;
  the backplate includes a bottom plate and side plates, the side plates being located at side edges of the bottom plate, and the bottom plate and the side plates form an accommodating space;
  the light guide plate and the optical film layer are sequentially stacked on the bottom plate, and are located in the accommodating space;
  the backlight module includes a display area and a bezel area located at a periphery of the display area;
  the light guide plate includes a main body portion and a first limiting portion, the first limiting portion being arranged on a side, facing the optical film layer, of the main body portion, at least part of the first limiting portion being located in the bezel area, and the first limiting portion being configured to limit a position of the optical film layer; and
  an orthographic projection of the first limiting portion on the bottom plate is at least partially located outside a side edge of the bottom plate.

In some implementations, the side plates include a first side plate and a second side plate, the first side plate and the second side plate are respectively located at different side edges of the bottom plate:
  a side edge of the first side plate is butted with a side edge of the bottom plate, and the first side plate is a plane plate or a curved plate;
  a side edge of the second side plate is butted with a side edge of the bottom plate, and the second side plate is a plane plate or a curved plate.

In some implementations, a part of a side edge of the main body portion close to the first side plate extends, in a plane parallel to the bottom plate, towards outside of the accommodating space to form a first flange;
  the first flange is located in the bezel area;
  an orthographic projection of the first flange on the bottom plate is at least partially overlapped with an orthographic projection of the first side plate on the bottom plate; and
  the first limiting portion is at least partially located on the first flange.

In some implementations, an end of the first side plate away from the bottom plate is provided with a first notch at a position corresponding to the first flange;
  at least a portion of the first flange is located in the first notch.

In some implementations, the first side plate is provided therein with a through hole at a position corresponding to the first flange;
  at least a portion of the first flange is located in the through hole.

In some implementations, a thickness of the first flange in a direction away from the bottom plate is greater than 1 mm and less than a thickness, in the direction away from the bottom plate, of a part of the main body portion except the first flange.

In some implementations, the first limiting portion extends in the direction away from the first flange;
  a side edge of the optical film layer close to the first side plate is provided therein with a second notch;
  the first limiting portion is matched with the second notch in shape, in a first direction in which the first side plate is away from the display area, the second notch has a size larger than that of the first limiting portion, and in a second direction perpendicular to the first direction, the second notch has a size the same as a size of the first limiting portion.

In some implementations, an orthographic projection of the first limiting portion on the bottom plate is at least partially located within a region where an orthographic projection of the second notch on the bottom plate is located.

In some implementations, a distance between an end face of the first limiting portion away from the first flange and the bottom plate is greater than or equal to a distance between a surface of the optical film layer away from the light guide plate and the bottom plate.

In some implementations, a first spacing between a side edge of the display area close to the first side plate and the first side plate is greater than 0 mm and less than 4 mm.

In some implementations, a spacing between a side edge of the display area close to the first side plate and the first limiting portion is greater than 0 mm and smaller than the first spacing.

In some implementations, the backlight module further includes a lamp strip disposed on a side of the second side plate close to the light guide plate,
  the lamp strip includes a base substrate and a plurality of light sources arranged on the base substrate at intervals, light emitting surfaces of the light sources face an end face, at a side edge of the light guide plate, of the light guide plate.

In some implementations, a part of a side edge of the main body portion close to the second side plate extends, in a plane parallel to the bottom plate, in a direction towards outside of the accommodating space to form a second flange;

the second flange is located in the bezel area, and at least part of the second flange is located in a space between two adjacent light sources.

In some implementations, the light guide plate further includes a second limiting portion located on a side, close to the optical film layer, of the main body portion, the second limiting portion being located in the bezel area;

the second limiting portion is arranged on the second flange, and at least part of the second limiting portion is located in a space between two adjacent light sources.

In some implementations, an orthographic projection of a side edge of the main body portion close to the second side plate on the bottom plate is on a side of orthographic projections of the light sources on the bottom plate away from an orthographic projection of the base substrate on the bottom plate.

In some implementations, the light guide plate further includes a second limiting portion located on a side, close to the optical film layer, of the main body portion, the second limiting portion being located in the bezel area;

an orthographic projection of the second limiting portion on the bottom plate is at least partially overlapped with an orthographic projection of a side edge, close to the second side plate, of the main body portion on the bottom plate, and at least part of the second limiting portion is located in a space between two adjacent light sources.

In some implementations, the second limiting portion extends in a direction away from the main body portion;

a side edge of the optical film layer close to the second side plate is provided therein with a third notch;

the second limiting portion is matched with the third notch in shape, in a third direction in which the second side plate is away from the display area, the third notch has a size larger than that of the second limiting portion, and in a fourth direction perpendicular to the third direction, the third notch has a size the same as that of the second limiting portion.

In some implementations, the orthographic projection of the second limiting portion on the bottom plate is at least partially located within a region where an orthographic projection of the third notch on the bottom plate is located.

In some implementations, a distance between an end face of the second limiting portion away from the second flange and the bottom plate is greater than or equal to a distance between a surface of the optical film layer away from the light guide plate and the bottom plate.

In some implementations, a second spacing between a side edge of the display area close to the second side plate and the second side plate is greater than 4 mm.

In some implementations, a spacing between the side edge of the display area close to the second side plate and the second limiting portion is greater than 4 mm and smaller than the second spacing.

In some implementations, the first limiting portion and the second limiting portion are located in the bezel area on a same side outside the display area.

In some implementations, the first side plate is perpendicular to the second side plate, and the first side plate is adjacent to the second side plate; and two first side plates are provided.

In some implementations, two first flanges and two first limiting portions are provided:

the two first limiting portions are arranged in correspondence with the two first side plates one to one, and distances between one of the two first limiting portions and the second side plate and between the other of the two first limiting portions and the second side plate are equal to each other.

In some implementations, one second flange and one second limiting portion are provided.

In some implementations, the orthographic projection of the second limiting portion on the bottom plate is located at a middle position of an orthographic projection of the second side plate on the bottom plate.

In some implementations, the backlight module further includes a rubber frame, the rubber frame is disposed outside the backplate, and the rubber frame wraps a side of the first side plate and a side of the second side plate away from the accommodating space:

the rubber frame wraps the bezel area and limits the display area.

In a second aspect, an embodiment of the present disclosure further provides a display panel including a display substrate and the backlight module described above, the backlight module is arranged on a light incident side of the display substrate and configured to provide backlight for the display substrate.

In a third aspect, an embodiment of the present disclosure further provides a display device including the display panel described above.

DRAWINGS

The accompanying drawings are included to provide a further understanding of the embodiments of the present disclosure, and are incorporated in and constitute a part of the specification, illustrate embodiments of the present disclosure and together with the description serve to explain the principles of the present disclosure and do not to limit the present disclosure. The above and other features and advantages will become more apparent to those skilled in the art by describing in detail exemplary embodiments with reference to the attached drawings, in which.

DETAILED DESCRIPTION

Figure 1:
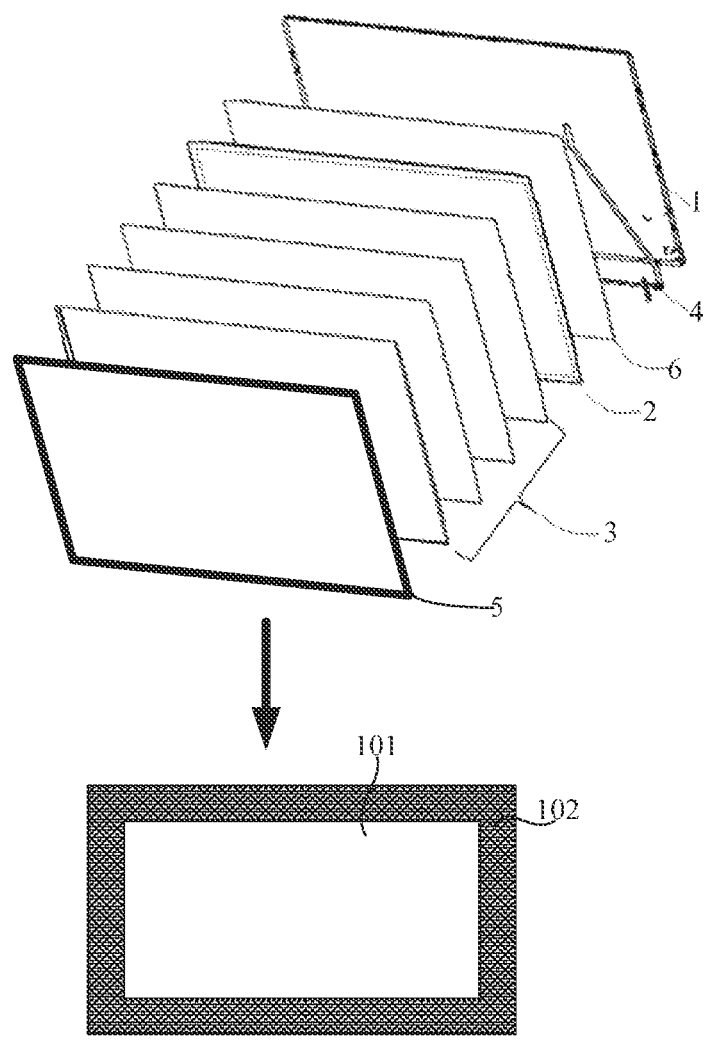
FIG. 1 shows schematic structural diagrams illustrating an exploded view and an assembled view of a backlight module in the related art.

In order to make those skilled in the art better understand the technical solutions of the embodiments of the present disclosure, a backlight module, a display panel, and a display device provided in the embodiments of the present disclosure are described in further detail below with reference to the accompanying drawings.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that the present disclosure will be thorough and complete, and will fully convey the scope of the present disclosure to those skilled in the art.

The embodiments in the present disclosure are not limited to the embodiments shown in the drawings, but include modifications of configurations formed based on a manufacturing process. Thus, regions illustrated in the figures have schematic properties, and shapes of the regions shown in the figures illustrate specific shapes of the regions, but are not intended to be limiting.

In the related art, referring to FIG. 1, a backlight module includes a backplate 1, and a reflective sheet 6, a light guide plate 2 and an optical film layer 3 sequentially stacked on the backplate 1. The backplate 1 includes a bottom plate and side plates at a periphery of the bottom plate, the bottom plate and the side plates form an accommodating space, and the reflective sheet 6, the light guide plate 2 and the optical film layer 3 are located in the accommodating space. The backlight module further includes a lamp strip 4, the lamp strip 4 being arranged on the side plates, and light emitting surfaces of light sources of the lamp strip 4 face end faces of the light guide plate 2 at edges of the light guide plate, that is, the backlight module has a side-in type backlight source. The backlight module further includes a rubber frame 5, and the rubber frame 5 wraps peripheral edges and end faces of the optical film layer 3 and the light guide plate 2 at edges thereof in the backlight module so as to further fix the film layers in the backlight module and prevent light leakage at the edges of the backlight module. The peripheral edges of the backlight module wrapped by the rubber frame 5 form a peripheral bezel area 102 of the backlight module, and the rubber frame 5 is made of a light-blocking material, so that the peripheral bezel area 102 of the backlight module is optically opaque, and a middle area of the backlight module surrounded by the peripheral bezel area 102 is optically transparent and forms a display area 101 of the backlight module. The optical film layer 3 includes a plurality of film layers, such as a diffusion film, a lower brightness enhancement film (prism film), an upper brightness enhancement film and the like, and the lower brightness enhancement film and the upper brightness enhancement film are configured to enable light to be more uniform and soft and increase brightness enhancement effect. The reflective sheet 6 is attached to the bottom plate. The optical film layer 3 is fixed in its position by a fixing structure provided on the light guide plate 2, so that the optical film layer 3 cannot move relative to the light guide plate in a reliability test and/or under mechanical impact, and good performance of the backlight module is ensured.

In the related art, in the backlight module of a on-vehicle display module, the optical film layer is fixed in the following method: a bump is provided at an edge of the light guide plate, a groove is provided at an edge of the optical film layer, and the groove and the bump are snapped with each other, so that a position of the optical film layer is limited relative to the light guide plate.

The bump is located in the peripheral bezel area of the backlight module, but the bump at the edge of the light guide plate is easy to produce a bright spot when the backlight module is lit. In a case where a bezel of the backlight module is relatively wide, the bump may be arranged at the edge of the light guide plate relatively far away from the display area, and the bright spot produced by the bump is invisible, however, in a design of the backlight module with a narrow bezel or an ultra-narrow bezel, the position of the bump at the edge of the light guide plate is limited, and the bump cannot be farther away from the display area, so that the bright spot produced by the bump is obviously visible at a certain viewing angle, and the quality of picture displayed by the display module is influenced. For example, the light source is arranged on a side plate parallel to an X-axis direction, and bonding wiring area of the display module is usually arranged on the same side as the side plate parallel to the X-axis direction, so that the bezel of the backlight module at the side where the side plate is located is relative wide, for example, a width of the bezel is about 4 mm, and the bezels at other sides of the backlight module, except the bezel at the side where the side plate is located, are relative narrow or ultra-narrow, for example, a width of each of the bezels is less than about 4 mm. In a case where a distance between the bump at the edge along the X-axis direction and the display area is relatively small, or a distance between the bump at the edge along a Y-axis direction and the display area is less than 0, the bright spot produced by the bump can be seen at a certain viewing angle (for example, at a larger viewing angle, such as a viewing angle larger than about 45°). The quality of picture displayed is affected.

The influence of the bright spot produced by the bump may be slightly improved by reducing a size of the bump on the light guide plate to increase the distance between the bump and the display area, however, too small size of the bump may affect strength of the bump, and there will be a risk of fracture in the bump in a mechanical vibration test, which is easy to cause new defects.

Figure 2:
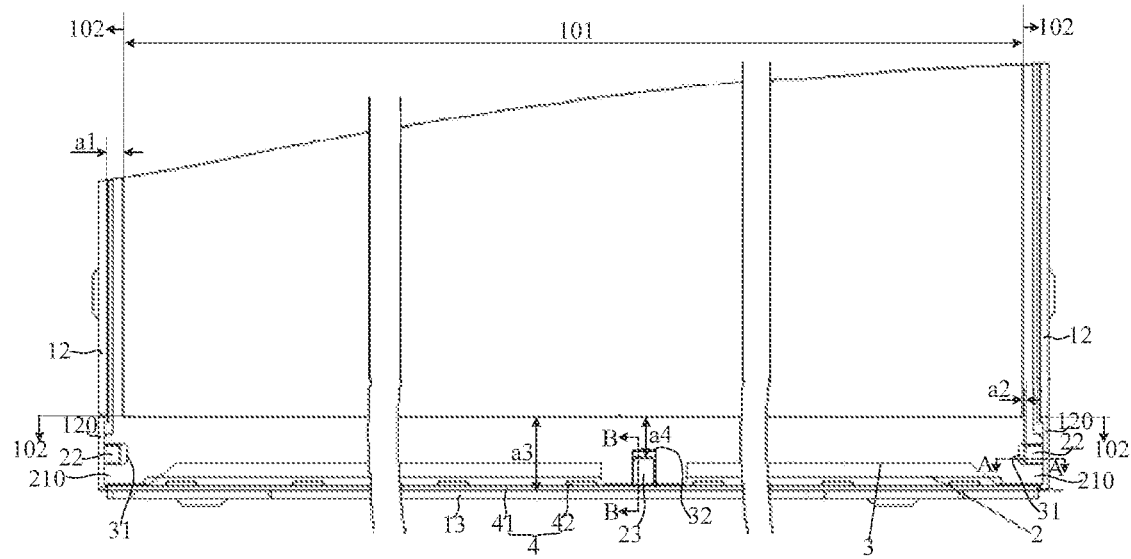
FIG. 2 is a schematic top view of a partial structure of a backlight module according to an embodiment of the present disclosure.
Figure 3:
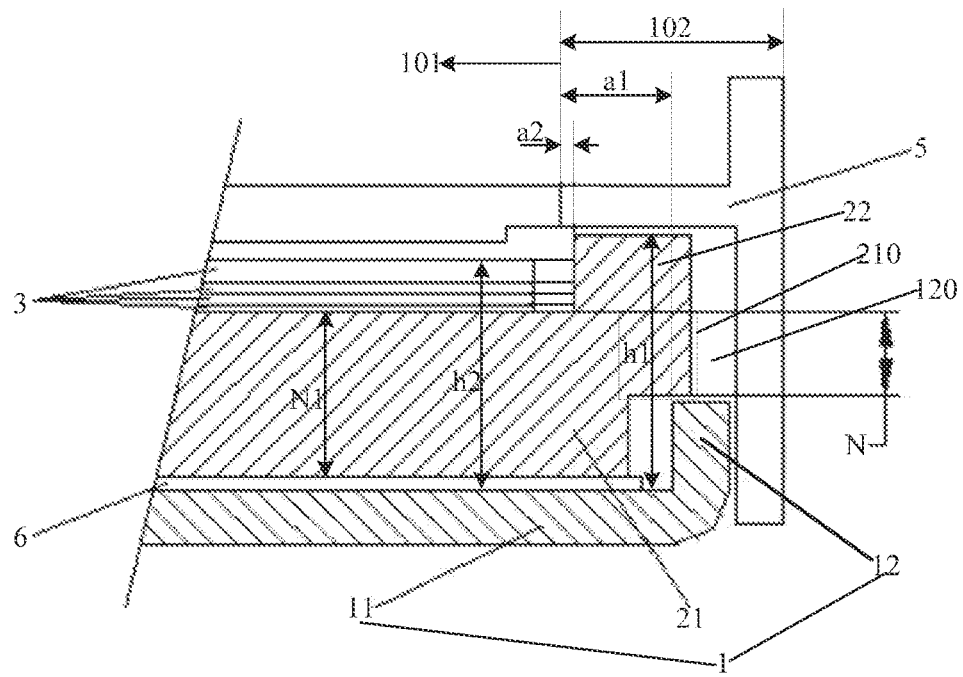
FIG. 3 is a cross-sectional diagram of the backlight module taken along a cutting line AA shown in FIG. 2.

In view of above problems of the backlight module in the related art, an embodiment of the present disclosure provides a backlight module, referring to FIGS. 2 to 3, including; a backplate 1, a light guide plate 2 and an optical film layer 3. The backplate 1 includes a bottom plate 11 and side plates, the side plates are located at edges of the bottom plate 11, and the bottom plate 11 and the side plates form and surround an accommodating space. The light guide plate 2 and the optical film layer 3 are sequentially stacked on the bottom plate 11. The backlight module includes a display area 101 and a bezel area 102, and the bezel area 102 is located at a periphery of the display area 101. The light guide plate 2 includes a main body portion 21 and a first limiting portion 22, the first limiting portion 22 is disposed on a side of the main body portion 21 facing the optical film layer 3, and at least part of the first limiting portion 22 is located in the bezel area 102. The first limiting portion 22 is configured to limit a position of the optical film layer 3. An orthographic projection of the first limiting portion 22 on the bottom plate 11 is at least partially located outside an edge of the bottom plate 11. Areas where orthographic projections of the side plates on a plane where the bottom plate is located are defined to be located outside the edges of the bottom plate.

The orthographic projection of the first limiting portion 22 on the bottom plate 11 is at least partially located outside the edge of the bottom plate 11, so that an area where the first limiting portion 22 is located may extend from inside of the accommodating space to the edge of the bottom plate 11 and even outside the edge of the bottom plate 11, thus a position of the first limiting portion 22 may be further away from the display area 101 than that in the related art, and the phenomenon that the bright spot produced by the first limiting portion 22 can be seen when the backlight module is lit is improved or avoided.

Figure 4:
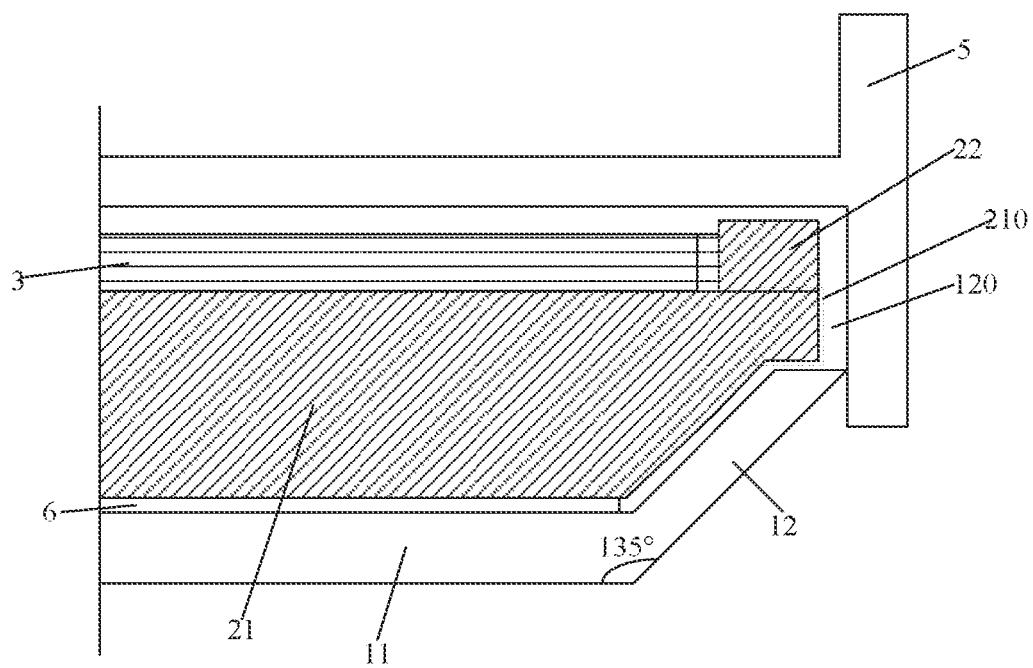
FIG. 4 is a cross-sectional diagram of the backlight module taken along a cutting line AA shown in FIG. 2 when an included angle of 135° is formed between a first side plate and a bottom plate.

In some implementations, the side plates include a first side plate 12 and a second side plate 13. The first side plate 12 and the second side plate 13 are respectively located at different side edges of the bottom plate 11. One of side edges of the first side plate 12 is butted with one of side edges of the bottom plate 11, and the first side plate 12 is a plane plate. An included angle between the first side plate 12 and the bottom plate 11 is greater than or equal to 90° and less than 180°. One of side edges of the second side plate 13 is butted with one of side edges of the bottom plate 11, and the second side plate 13 is a plane plate. An included angle between the second side plate 13 and the bottom plate 11 is greater than or equal to 90° and less than 180°. Referring to FIG. 4, an included angle between the first side plate 12 and the bottom plate 11 is about 135°.

In some implementations, the first side plate 12 is perpendicular to the second side plate 13. In some implementations, the first side plate 12 is adjacent to the second side plate 13, and the first side plate 12 and the second side plate 13 are butted and connected with each other.

In some implementations, two first side plates 12 are provided, and one second side plate 13 is provided, and the two first side plates 12 are respectively adjacent to, perpendicular to and butted with the second side plate 13.

In some implementations, the first side plate 12 is a curved plate, for example, the first side plate 12 is an arc plate that bends toward a direction away from the display area 101. The first side plate 12 may be a wavy curved plate or a curved plate of other shapes. The second side plate 13 is a curved plate, for example, the second side plate 13 is an arc plate that bends toward the direction away from the display area 101. The second side plate 13 may also be a wavy curved plate or a curved plate of other shapes.

In the embodiment, in order to realize the smallest width of the bezel area 102 of the backlight module, the included angle between the first side plate 12 and the bottom plate 11 is about 90°, and the included angle between the second side plate 13 and the bottom plate 11 is about 90°.

In some implementations, a part of a side edge of the main body portion 21 close to the first side plate 12 extends, in a plane parallel to the bottom plate 11, toward outside of the accommodating space to form a first flange 210. The first flange 210 is located in the bezel area 102. An orthographic projection of the first flange 210 on the bottom plate 11 is at least partially overlapped with an orthographic projection of the first side plate 12 on the bottom plate 11. The first limiting portion 22 is at least partially located on the first flange 210. The first flange 210 can support the first limiting portion 22. The main body portion 21 of the light guide plate 2 extends toward outside of the accommodating space to form the first flange 210, so that, compared with the related art, the region where the first limiting portion 22 is located is extended and expanded. Since the region where the first limiting portion 22 is located is extended and expanded toward outside of the accommodating space compared with the related art, the position where the first limiting portion 22 is located can be further away from the display area 101 than that in the related art, and the phenomenon that the bright spot produced by the first limiting portion 22 can be seen when the backlight module is lit is further improved or avoided.

In some implementations, referring to FIGS. 2 and 3, an end of the first side plate 12 away from the bottom plate 11 is provided with a first notch 120 at a position corresponding to the first flange 210, and at least a portion of the first flange 210 is located in the first notch 120. That is, compared with the related art, the region where first limiting portion 22 is located extends and expands into the first notch 120, so that the position where the first limiting portion 22 is located is further away from the display area 101 than that in the related art, and the phenomenon that the bright spot produced by the first limiting portion 22 can be seen when the backlight module is lit is further improved or avoided.

In some implementations, a thickness N of the first flange 210 in the direction away from the bottom plate 11 is greater than 1 mm and less than a thickness N1 of a portion of the main body portion 21 except the first flange 210 in the direction away from the bottom plate 11. In such way, a strength of the first flange 210 can be ensured, so that the first flange 210 can sufficiently support the first limiting portion 22.

Figure 5:
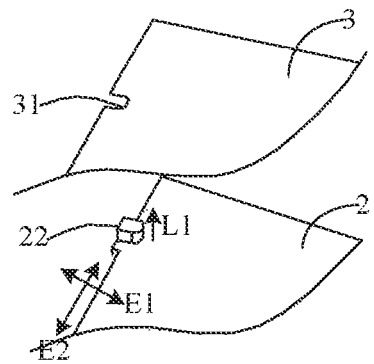
FIG. 5 is a schematic diagram illustrating matching between a first limiting portion and a second notch in an embodiment of the present disclosure.

In some implementations, referring to FIG. 5, the first limiting portion 22 extends in a direction L1 away from the first flange 210. A second notch 31 is formed in a side edge of the optical film layer 3 close to the first side plate 12. The first limiting portion 22 is matched with the second notch 31 in shape, and in a first direction E1 in which the first side plate 12 is away from the display area 101, a size of the second notch 31 is larger than a size of the first limiting portion 22. In a second direction E2 perpendicular to the first direction E1, a size of the second notch 31 is the same as that of the first limiting portion 22. Therefore, in the first direction E1, there is redundant space for the optical film layer 3 to deform when expanded with heat and contracted with cold; in the second direction E2, the position of the optical film layer 3 is fixed relative to the light guide plate 2.

In some implementations, an orthographic projection of the first limiting portion 22 on the bottom plate 11 is at least partially located within an area where an orthographic projection of the second notch 31 on the bottom plate 11 is located. Thus, the second notch 31 and the first limiting portion 22 can be matched with each other.

Figure 6:
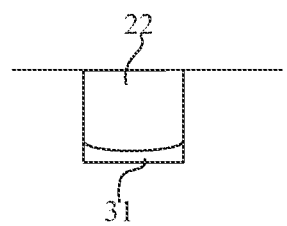
FIG. 6 is a schematic diagram illustrating orthographic projections of the first limiting portion and the second notch on a bottom plate in an embodiment of the present disclosure.

In some implementations, referring to FIG. 6, the orthographic projection of the first limiting portion 22 on the bottom plate 11 is entirely located within the area where the orthographic projection of the second notch 31 on the bottom plate 11 is located. In this way, the first limiting portion 22 can be better prevented from escaping from the second notch 31 in the mechanical vibration test, so that the position of the optical film layer 3 can be better ensured to be fixed relative to the light guide plate 2.

Figure 7:
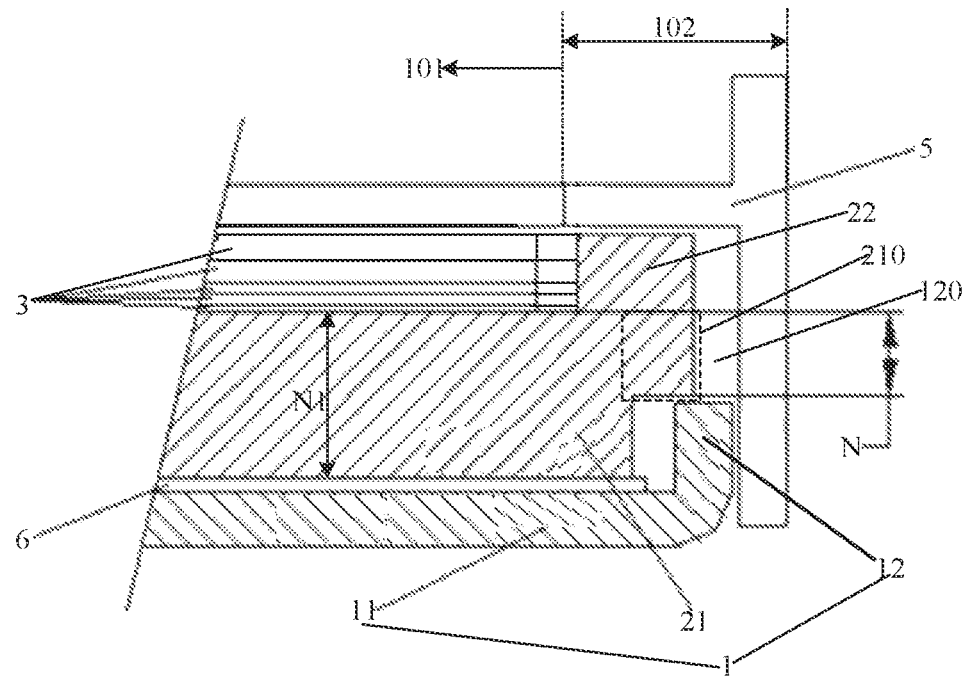
FIG. 7 is another cross-sectional diagram of the backlight module taken along the cutting line AA shown in FIG. 2.

In some implementations, referring to FIG. 7, a distance between an end face of the first limiting portion 22 away from the first flange 210 and the bottom plate 11 is equal to a distance between a surface of the optical film layer 3 away from the light guide plate 2 and the bottom plate 11.

In some implementations, referring to FIG. 3, the distance h1 between the end face of the first limiting portion 22 away from the first flange 210 and the bottom plate 11 is greater than the distance h2 between the surface of the optical film layer 3 away from the light guide plate 2 and the bottom plate 11.

In some implementations, referring to FIGS. 2 and 3, a first spacing a1 between a side edge of display area 101 close to the first side plate 12 and first side plate 12 is greater than 0 mm and less than 4 mm. The first spacing a1 is a net width of the bezel area 102 at a side of the backlight module, excluding the first side plate 12 and the rubber frame, with such net width of the bezel area 102, a narrow bezel is formed at the side of the backlight module.

In some implementations, a spacing a2 between a side edge of the display area 101 close to the first side plate 12 and the first limiting portion 22 is greater than 0 mm and less than the first spacing a1. The spacing a2 is a spacing between the side edge of the display area 101 close to the first side plate 12 and a side of the first limiting portion 22 close to the display area 101.

Figure 8:
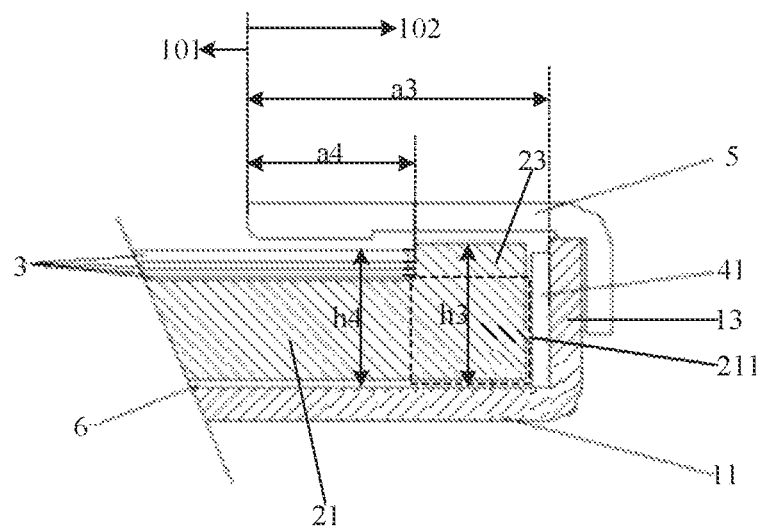
FIG. 8 is a cross-sectional diagram of the backlight module taken along a cutting line BB shown in FIG. 2.

In some implementations, referring to FIGS. 2 and 8, the backlight module further includes a lamp strip 4, and the lamp strip 4 is disposed on a side of the second side plate 13 close to the light guide plate 2. The lamp strip 4 includes a base substrate 41 and a plurality of light sources 42 arranged on the base substrate 41 at intervals, light emitting surfaces of the light sources 42 face an end face of the light guide plate 2 at the edge of the light guide plate.

In some implementations, a part of a side edge of the main body portion 21 close to the second side plate 13 extends, in a plane parallel to the bottom plate 11, toward outside of the accommodating space to form a second flange 211. The second flange 211 is located in the bezel area 102, and at least part of the second flange 211 is located in a space between two adjacent light sources 42.

In some implementations, the light guide plate 2 further includes a second limiting portion 23, the second limiting portion 23 is disposed on a side of the main body portion 21 close to the optical film layer 3, and the second limiting portion 23 is located in the bezel area 102. The second limiting portion 23 is disposed on the second flange 211, and at least a part of the second limiting portion 23 is located in a space between two adjacent light sources 42. The second flange 211 can support the second limiting portion 23.

The main body portion 21 of the light guide plate 2 extends toward outside of the accommodating space to form the second flange 211, so that a region where the second limiting portion 23 is located can be extended and expanded compared with the related art, and at least a part of the second flange 211 is located in the space between two adjacent light sources 42, so that, compared with the related art, the region where the second limiting portion 23 is located can be extended and expanded to the space between two adjacent light sources 42, till a surface of the base substrate 41, and thus the position where the second limiting portion 23 is located can be further away from the display area 101 compared with the related art, and the phenomenon that bright spot produced by the second limiting portion 23 can be seen when the backlight module is lit is improved or avoided.

Figure 9:
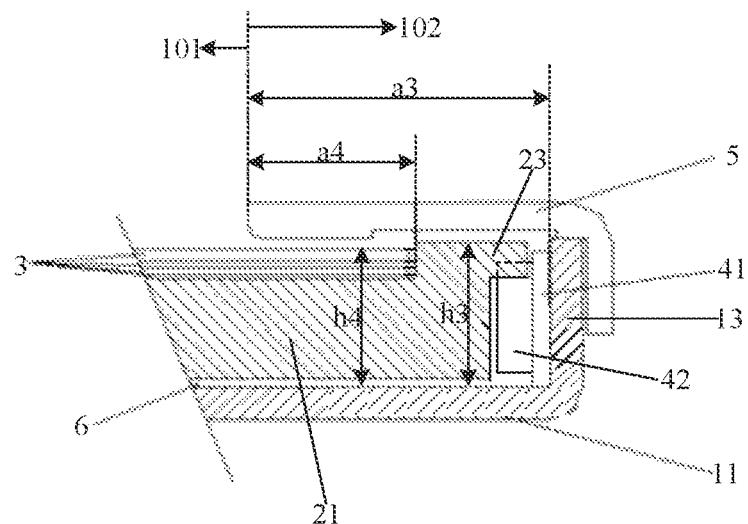
FIG. 9 is another cross-sectional diagram of the backlight module taken along the cutting line BB shown in FIG. 2.

In some implementations, referring to FIG. 9, an orthographic projection of a side edge of the main body portion 21 close to the second side plate 13 on the bottom plate 11 is located on a side of an orthographic projection of each light source 42 on the bottom plate 11 away from an orthographic projection of the base substrate 41 on the bottom plate 11. That is, no second flange may be formed on the main body portion 21.

In some implementations, the side edge of the main body portion 21 close to the second side plate 13 is parallel to the second side plate 13.

In some implementations, referring to FIG. 9, the light guide plate 2 further includes a second limiting portion 23, the second limiting portion 23 is disposed on a side of the main body portion 21 close to the optical film layer 3, and the second limiting portion 23 is located in the bezel area 102. An orthographic projection of the second limiting portion 23 on the bottom plate 11 is at least partially overlapped with an orthographic projection of a side edge of the main body portion 21 close to the second side plate 13 on the bottom plate 11, and at least part of the second limiting portion 23 is located in a space between two adjacent light sources 42.

Referring to FIG. 9, at least part of the second limiting portion 23 is located in the space between two adjacent light sources 42, so that, compared with the related art, the second limiting portion 23 can extend into the space between two adjacent light sources 42, till a surface of the base substrate 41, and the second limiting portion 23 can be further away from the display area 101, thereby improving or avoiding the phenomenon that the bright spot produced by the second limiting portion 23 can be seen when the backlight module is lit.

Figure 10:
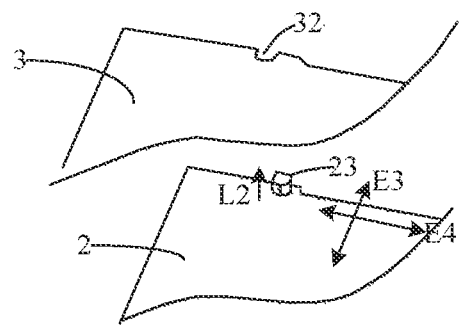
FIG. 10 is a schematic diagram illustrating matching between a second limiting portion and a third notch in an embodiment of the present disclosure.

In some implementations, referring to FIG. 10, the second limiting portion 23 extends in a direction L2 away from the main body portion 21. A third notch 32 is formed at a side edge of the optical film layer 3 close to the second side plate 13. The second limiting portion 23 is matched with the third notch 32 in shape, and in a third direction E3 in which the second side plate 13 is away from the display area 101, a size of the third notch 32 is larger than that of the second limiting portion 23. In a fourth direction E4 perpendicular to the third direction E3, the third notch 32 has a size the same as that of the second limiting portion 23. In such way, in the third direction E3, there is redundant space for the optical film layer 3 to deform when expanded with heat and contracted with cold; in the fourth direction E4, the position of the optical film layer 3 is fixed relative to the light guide plate 2.

In some implementations, an orthographic projection of the second limiting portion 23 on the bottom plate 11 is at least partially located within a region where an orthographic projection of the third notch 32 on the bottom plate 11 is located. Thus, the third notch 32 and the second limiting portion 23 may be matched with each other.

Figure 11:
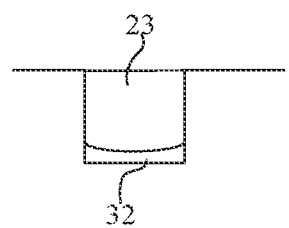
FIG. 11 is a schematic diagram illustrating orthographic projections of the second limiting portion and the third notch on the bottom plate in an embodiment of the present disclosure.

In some implementations, referring to FIG. 11, the orthographic projection of the second limiting portion 23 on the bottom plate 11 is completely located within the region where the orthographic projection of the third notch 32 on the bottom plate 11 is located. In this way, the second limiting portion 23 can be better prevented from escaping from the third notch 32 in the mechanical vibration test, and the position of the optical film layer 3 can be better ensured to be fixed relative to the light guide plate 2.

Figure 12:
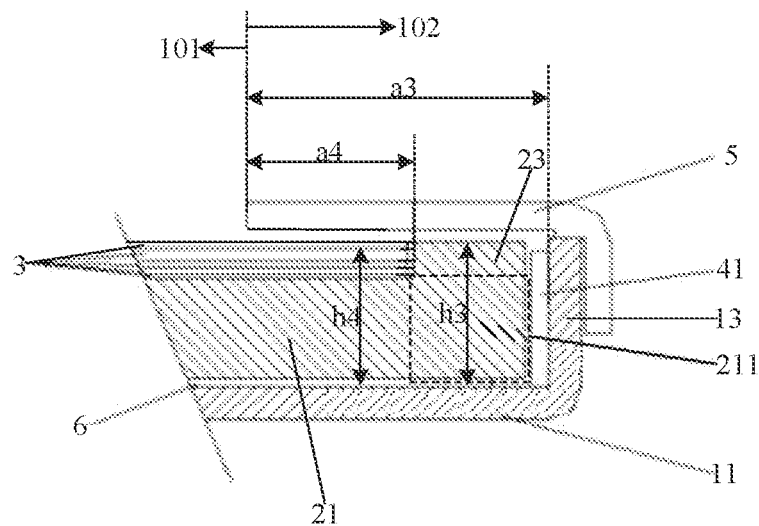
FIG. 12 is further another cross-sectional diagram of the backlight module taken along the cutting line BB shown in FIG. 2.

In some implementations, referring to FIG. 12, a distance between an end face of the second limiting portion 23 away from the second flange 211 and the bottom plate 11 is equal to a distance between a surface of the optical film layer 3 away from the light guide plate 2 and the bottom plate 11.

In some implementations, referring to FIG. 8, a distance h3 between the end face of the second limiting portion 23 away from the second flange 211 and the bottom plate 11 is greater than a distance h4 between the surface of the optical film layer 3 away from the light guide plate 2 and the bottom plate 11.

In some implementations, referring to FIGS. 2 and 8, a second spacing a3 between a side edge of display area 101 close to the second side plate 13 and the second side plate 13 is greater than about 4 mm. The second spacing a3 is a net width of the bezel area 102 at a corresponding side of the backlight module, excluding the second side plate 13 and the rubber frame, and since the bonding wiring area of the display module is usually disposed at the corresponding side, the net width of the bezel area at the corresponding side of the backlight module is relative large.

In some implementations, a distance a4 between the side edge of the display area 101 close to the second side plate 13 and the second limiting portion 23 is greater than about 4 mm and smaller than the second distance a3. The spacing a4 is a spacing between the side edge of the display area 101 close to the second side plate 13 and a side of the second limiting portion 23 close to the display area 101.

In some implementations, the first side plate 12 is perpendicular to the second side plate 13. The first limiting portion 22 and the second limiting portion 23 are respectively provided at sides opposite to the first side plate 12 and second side plate 13 that are perpendicular to each other, so that the optical film layer 3 can be fixed respectively in two directions that are perpendicular to each other, therefore, in the reliability test and/or the mechanical vibration test, the optical film layer 3 will not move relative to the light guide plate 2, the firm fixation of the optical film layer 3 and good optical performance of the backlight module can be achieved.

In some implementations, the first side plate 12 is adjacent to the second side plate 13. The first side plate 12 and the second side plate 13 are butted and connected with each other.

In some implementations, two first side plate 12 and one second side plate 13 may be provided. The two first side plates 12 are respectively adjacent to, perpendicular to and butted with the second side plate 13.

In some implementations, two first flanges 210 and two first limiting portions 22 are provided, the two first limiting portions 22 are disposed in correspondence with the two first side plates 12 one to one, and distances between one of the two first limiting portions 22 and the second side plate 13 and between the other of the two first limiting portions 22 and the second side plate 13 are equal to each other. Two first flanges 210 and two first limiting portions 22 are provided, so that the position of the optical film layer 3 relative to the light guide plate 2 can be further ensured to be firmly fixed in the reliability test and/or the mechanical vibration test, and the strength that the first limiting portions 22 is fixed can be ensured. Meanwhile, the optical film layer 3 can be ensured to be freely stretched and contracted when expanded with heat and contracted with cold under the fixation by the first limiting portions 22, and therefore the optical film layer 3 is prevented from being wrinkled.

In some implementations, one second flange 211 and one second limiting portion 23 are provided, so that the position of the optical film layer 3 relative to the light guide plate 2 can be further ensured to be firmly fixed in the reliability test and/or the mechanical vibration test, and the strength that the second limiting portion 23 is fixed can be ensured. Meanwhile, the optical film layer 3 can be ensured to be freely stretched and contracted when expanded with heat and contracted with cold under the fixation by the second limiting portion 23, and therefore the optical film layer 3 is prevented from being wrinkled.

In some implementations, an orthographic projection of the second limiting portion 23 on the bottom plate 11 is located at a middle position of an orthographic projection of the second side plate 13 on the bottom plate 11.

In some implementations, referring to FIG. 2, the first limiting portion 22 and the second limiting portion 23 are located in a same portion, at a side, of the bezel area 102 outside the display area 101, that is, located on a same side of a straight line along which an edge of the display area 101 extends. For example, the first limiting portion 22 and the second limiting portion 23 are located in a portion, at a lower side, of the bezel area 102 outside the display area 101. Since the portion of the bezel area 102 at the lower side is provided with the lamp strip 4 and the binding wiring area of the display module is usually disposed at the lower side, a net width, at the lower side, of the bezel area 102 of the backlight module is relatively large. In the embodiment, three limiting portions are disposed at edges of the light guide plate 3, that is, one second limiting portion 23 is provided on a side edge of the light guide plate 3 corresponding to the side where the second side plate 13 is located, and two first limiting portions 22 are respectively provided on two side edges of the light guide plate 3 corresponding to the sides where the two first side plates 12 are located. The two first limiting portions 22 are configured to limit the movement of the optical film layer 3 in a vertical direction, and the second limiting portion 23 is configured to limit the movement of the optical film layer 3 in a horizontal direction, therefore, risks of optical film layer being wrinkled in the reliability test, the optical film layer being scratched in the mechanical vibration test, or the like can be well avoided.

In some implementations, a shape of the backlight module may be a quadrilateral, such as a rectangle, or may be an irregular quadrilateral or polygon, or may be any shape such as a circle, an ellipse or the like.

In some implementations, referring to FIGS. 3 and 8, the backlight module further includes a rubber frame 5, the rubber frame 5 is disposed outside the backplate 1, and the rubber frame 5 wraps sides of the first side plate 12 and the second side plate 13 away from the accommodating space. The rubber frame 5 further forms the bezel area 102 and define the display area 101. Since the rubber frame 5 is made of a light-blocking material, the bezel area 102 of the backlight module is optically opaque, and the display area 101 surrounded by the bezel area 102 is optically transparent. Meanwhile, the rubber frame 5 can block the first notch 120 provided in the first side plate 12, so as to prevent light emitted by the light sources 42 from leaking at the first notch 120. The rubber frame 5 can further fix each film layer in the backlight module, and can also prevent light from leaking at edges of the backlight module.

In some implementations, referring to FIG. 3, the backlight module further includes a reflective sheet 6, and the reflective sheet 6 is disposed on a side of the bottom plate 11 facing the light guide plate 2 and is configured to reflect light irradiated thereon, so that the reflected light enters the light guide plate 2, thereby improving the rate that the light is utilized.

In some implementations, the light sources 42 are LED light beads. Certainly, the light sources 42 may also be other elements capable of emitting light, such as incandescent lamps, OLED light emitting elements, and the like.

Figure 13:
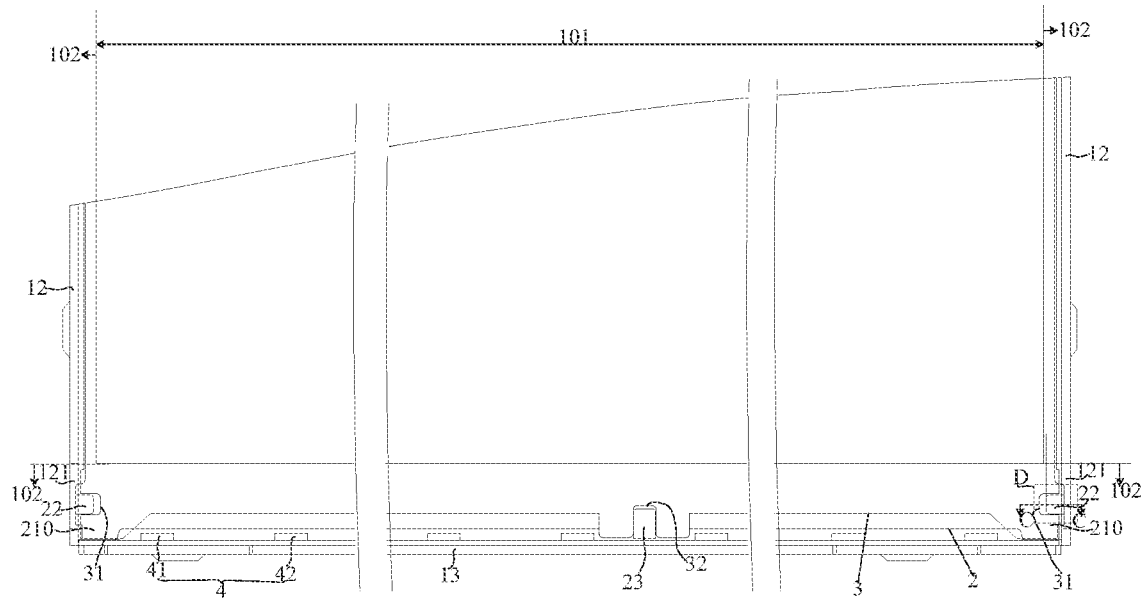
FIG. 13 is a schematic top view of a partial structure of a backlight module according to an embodiment of the present disclosure.
Figure 14:
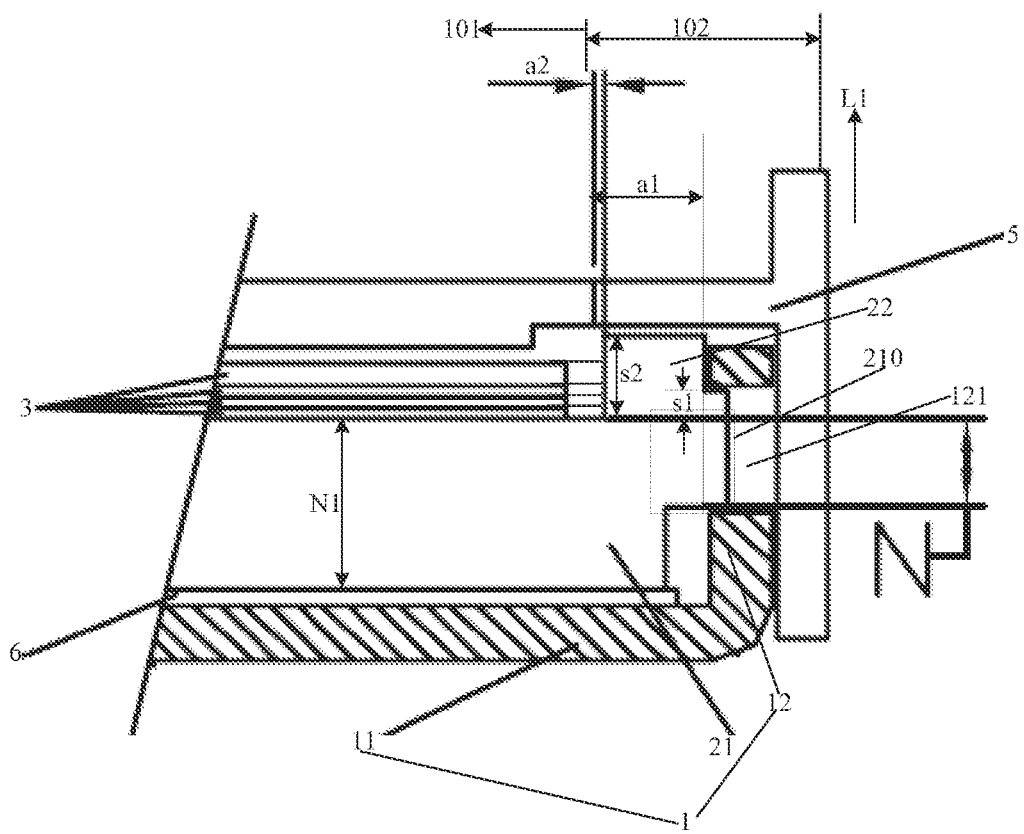
FIG. 14 is a cross-sectional diagram of the backlight module taken along a cutting line CC shown in FIG. 13.

An embodiment of the present disclosure further provides a backlight module, which is different from that in the above embodiment in that, referring to FIGS. 13 and 14, the first side plate 12 is provided with a through hole 121 at a position corresponding to the first flange 210. At least part of the first flange 210 is located in the through hole 121, and at least part of the first limiting portion 22 is located in the through hole 121.

Compared with the related art, the region where the first limiting portion 22 is provided extends into the through hole 121, and thus the position where the first limiting portion 22 is loated is further away from the display area 101, and the phenomenon that the bright spot produced by the first limiting portion 22 can be seen when the backlight module is lit is improved or avoided.

In some implementations, a portion of the first limiting portion 22 is located in the through hole 121. A thickness s1, in a direction L1 away from the first flange 210, of the portion of the first limiting portion 22 located in the through hole 121 is smaller than a thickness s2, in the direction L1 away from the first flange 210, of the remaining portion of the first limiting portion 22 located outside the through hole 121.

Figure 15:
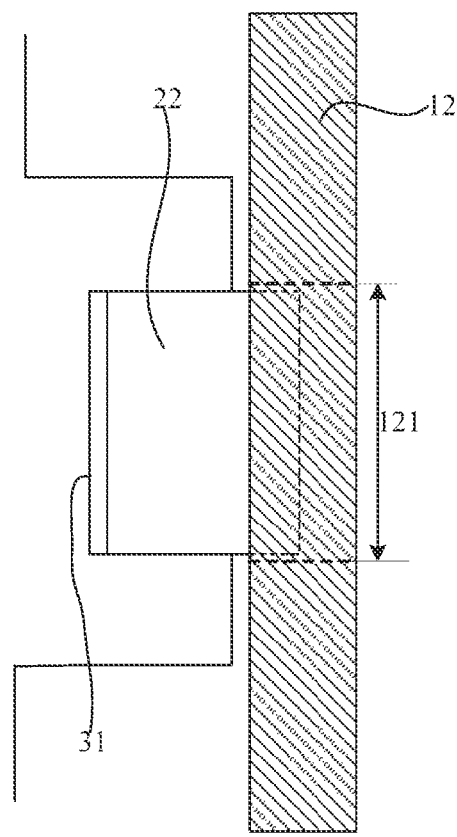
FIG. 15 is an enlarged top view of portion D of FIG. 13.

Referring to FIG. 15, for the convenience of installation of the optical film layer 3, a portion of the optical film layer 3 forming the second notch 31 only surrounds the portion of the first limiting portion 22 outside the through hole 121 at a periphery of the portion of the first limiting portion 22. In order to prevent the first limiting portion 22 from escaping from the second notch 31 in the mechanical vibration test, a size, in a direction away from the display area 101, of the portion of the first limiting portion 22 located outside the through hole 121 may be set larger than a size, in the direction away from the display area 101, of the portion of the first limiting portion 22 located in the through hole 121.

Other structures of the backlight module in the embodiment of the present disclosure are the same as those in the above embodiment, and are not described herein again.

In the backlight module provided in the embodiment of the present disclosure, the orthographic projection of the first limiting portion 22 on the bottom plate 11 is at least partially overlapped with the edge of the bottom plate 11, the optical film layer 3 is limited and fixed in one direction, and meanwhile, the region where the first limiting portion 22 is located can extend from inside of the accommodating space to the edge of the bottom plate 11 or even beyond the edge of the bottom plate 11, therefore, compared with the related art, the position where the first limiting portion 22 is located can be further away from the display area 101, thus the phenomenon that the bright spot produced by the first limiting portion 22 can be seen when the backlight module is lit can be improved or avoided. The main body portion 21 of the light guide plate 2 extends toward outside of the accommodating space to form the second flange 211, so that the region where the second limit portion 23 is located can be extended and expanded compared with the related art. At least part of the second flange 211 is located in the space between two adjacent light sources 42, so that, compared to the related art, the region where the second limit part 23 is located extends and expands into the space between two adjacent light sources 42, till the surface of the base substrate 41, and the position where the second limiting portion 23 is located can be further away from the display area 101, thereby improving or avoiding the phenomenon that the bright spot produced by the second limiting portion 23 can be seen when the backlight module is lit. Meanwhile, the second limiting portion 23 can limit and fix the optical film layer 3 in another direction, and the first limiting portion 22 and the second limiting portion 23 can ensure the limiting and fixing of the optical film layer 3 and the strength that the optical film layer 3 is fixed.

Figure 16:
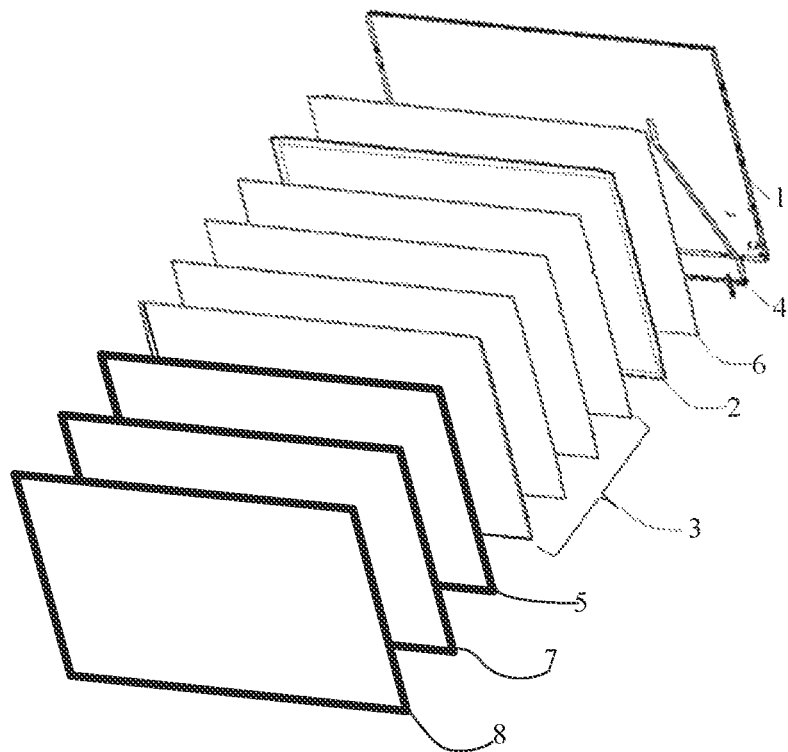
FIG. 16 is an exploded view of a display panel according to an embodiment of the present disclosure.

An embodiment of the present disclosure further provides a display panel, referring to FIG. 16, the display panel includes a display substrate 7, and further includes the backlight module in the above embodiment of the present disclosure, the backlight module is disposed at a light incident side of the display substrate 7 and configured to provide backlight for the display substrate 7.

In some implementations, the display panel may be a liquid crystal display panel, that is, the display substrate 7 is a liquid crystal cell formed by aligning and assembling an upper substrate and a lower substrate, and filling liquid crystal between the upper substrate and the lower substrate.

In some implementations, the display panel further includes a front frame 8, and the front frame 8 wraps peripheral edges and end faces of the display substrate 7 to protect the display substrate 7, and meanwhile, a bezel of the display substrate 7 can be formed, so that the whole display panel is more beautiful.

The display panel provided in the embodiment of the present disclosure can improve the quality and display effect of the display panel by using the backlight module in the embodiment of the present disclosure.

An embodiment of the present disclosure further provides a display device, which includes the display panel in the above embodiment of the present disclosure.

The display device provided in the embodiment of the present disclosure can improve the quality and the display effect of the display device by using the display panel in the above embodiment of the present disclosure.

The display device provided by the embodiment of the present disclosure may be any product or component with a display function, such as an LCD panel, an LCD television, a display, a mobile phone, a navigator and the like.

It will be understood that the above embodiments are merely exemplary embodiments employed to illustrate the principles of the present disclosure, and the present disclosure is not limited thereto. It will be apparent to those skilled in the art that various changes and modifications may be made therein without departing from the spirit and scope of the present disclosure, and these changes and modifications are to be considered within the scope of the present disclosure.

What is claimed is:

1. A backlight module, comprising: a backplate, a light guide plate and an optical film layer, wherein
   the backplate comprises a bottom plate and side plates, the side plates being located at side edges of the bottom plate, and the bottom plate and the side plates form an accommodating space;
   the light guide plate and the optical film layer are sequentially stacked on the bottom plate;
   the backlight module comprises a display area and a bezel area located at a periphery of the display area;

the light guide plate comprises a main body portion and a first limiting portion, the first limiting portion being arranged on a side, facing the optical film layer, of the main body portion, at least part of the first limiting portion being located in the bezel area, and the first limiting portion being configured to limit a position of the optical film layer; and an orthographic projection of the first limiting portion on the bottom plate is at least partially located outside a side edge of the bottom plate, wherein the side plates comprise a first side plate and a second side plate, the first side plate and the second side plate are respectively located at different side edges of the bottom plate, a side edge of the first side plate is butted with a side edge of the bottom plate, and the first side plate is a plane plate or a curved plate, a side edge of the second side plate is butted with a side edge of the bottom plate, and the second side plate is a plane plate or a curved plate;

a part of a side edge of the main body portion close to the first side plate extends, in a plane parallel to the bottom plate, toward outside of the accommodating space to form a first flange, the first flange being located in the bezel area, an orthographic projection of the first flange on the bottom plate being at least partially overlapped with an orthographic projection of the first side plate on the bottom plate, and the first limiting portion being at least partially located on the first flange;

an end of the first side plate away from the bottom plate is provided therein with a first notch at a position corresponding to the first flange, and at least a portion of the first flange is located in the first notch; or the first side plate is provided therein with a through hole at a position corresponding to the first flange, and at least a portion of the first flange is located in the through hole;

the first limiting portion extends in the direction away from the first flange, a side edge of the optical film layer close to the first side plate is provided therein with a second notch; the first limiting portion is matched with the second notch in shape, in a first direction in which the first side plate is away from the display area, the second notch has a size larger than that of the first limiting portion, and in a second direction perpendicular to the first direction, the second notch has a size the same as a size of the first limiting portion;

an orthographic projection of the first limiting portion on the bottom plate is at least partially located within a region where an orthographic projection of the second notch on the bottom plate is located, and a distance between an end face of the first limiting portion away from the first flange and the bottom plate is greater than or equal to a distance between a surface of the optical film layer away from the light guide plate and the bottom plate;

the backlight module further comprises a lamp strip disposed on a side of the second side plate close to the light guide plate, the lamp strip comprising a base substrate and a plurality of light sources arranged on the base substrate at intervals, light emitting surfaces of the light sources facing an end face, at a side edge of the light guide plate, of the light guide plate; and the light guide plate further comprises a second limiting portion located on a side, close to the optical film layer, of the main body portion, the second limiting portion being located in the bezel area, and a part of a side edge of the main body portion close to the second side plate extends, in a plane parallel to the bottom plate, toward outside of the accommodating space to form a second flange, the second flange is located in the bezel area, and at least part of the second flange is located in a space between two adjacent light sources, the second flange is located in the bezel area, at least part of the second flange is located in a space between two adjacent light sources, and the second limiting portion is arranged on the second flange, and at least part of the second limiting portion is located in a space between two adjacent light sources; or an orthographic projection of a side edge of the main body portion close to the second side plate on the bottom plate is on a side of orthographic projections of the light sources on the bottom plate away from an orthographic projection of the base substrate on the bottom plate, and an orthographic projection of the second limiting portion on the bottom plate is at least partially overlapped with an orthographic projection of a side edge, close to the second side plate, of the main body portion on the bottom plate, and at least part of the second limiting portion is located in a space between two adjacent light sources.

2. The backlight module according to claim 1, wherein in a case where a portion of the first flange is located in the first notch, a thickness of the first flange in a direction away from the bottom plate is greater than about 1 mm and less than a thickness, in the direction away from the bottom plate, of a part of the main body portion except the first flange.

3. The backlight module according to claim 1, wherein a first spacing between a side edge of the display area close to the first side plate and the first side plate is greater than 0 mm and less than about 4 mm, and a spacing between a side edge of the display area close to the first side plate and the first limiting portion is greater than 0 mm and smaller than the first spacing.

4. The backlight module according to claim 1, wherein the second limiting portion extends in a direction away from the main body portion;

a side edge of the optical film layer close to the second side plate is provided therein with a third notch;

the second limiting portion is matched with the third notch in shape, in a third direction in which the second side plate is away from the display area, the third notch has a size larger than that of the second limiting portion, and in a fourth direction perpendicular to the third direction, the third notch has a size the same as that of the second limiting portion.

5. The backlight module according to claim 4, wherein the orthographic projection of the second limiting portion on the bottom plate is at least partially located within a region where an orthographic projection of the third notch on the bottom plate is located.

6. The backlight module according to claim 1, wherein a distance between an end face of the second limiting portion away from the second flange and the bottom plate is greater than or equal to a distance between a surface of the optical film layer away from the light guide plate and the bottom plate, and wherein one second flange and one second limiting portion are provided.

7. The backlight module according to claim 4, wherein a second spacing between a side edge of the display area close to the second side plate and the second side plate is greater than about 4 mm, and a spacing between the side edge of the display area close to the second side plate and the second limiting portion is greater than about 4 mm and smaller than the second spacing.

8. The backlight module according to claim 7, wherein the first limiting portion and the second limiting portion are located in a same portion, at a side, of the bezel area outside the display area.

9. The backlight module according to claim 7, wherein the first side plate is perpendicular to the second side plate, and the first side plate is adjacent to the second side plate; and two first side plates are provided; and two first flanges and two first limiting portions are provided, the two first limiting portions are arranged in correspondence with the two first side plates one to one, and distances between one of the two first limiting portions and the second side plate and between the other of the two first limiting portions and the second side plate are equal to each other.

10. The backlight module according to claim 7, wherein the orthographic projection of the second limiting portion on the bottom plate is located at a middle position of an orthographic projection of the second side plate on the bottom plate.

11. The backlight module according to claim 10, further comprising a rubber frame, wherein the rubber frame is disposed outside the backplate, and the rubber frame wraps a side of the first side plate and a side of the second side plate away from the accommodating space;

the rubber frame further forms the bezel area and limits the display area.

12. A display panel, comprising a display substrate, and the backlight module according to claim 1, the backlight module being arranged on a light incident side of the display substrate and configured to provide backlight for the display substrate.

13. A display device, comprising the display panel according to claim 12.

* * * * *